Patented Aug. 16, 1949

2,479,491

UNITED STATES PATENT OFFICE 2,479,491

DIAZOTIZABLE PHTHALOCYANINE DERIVATIVES AND PROCESS FOR PREPARING SAME

Norman Hulton Haddock, William Owen Jones, Alexander Parkinson, and George Alston Rowe, Blackley, Manchester, England, assignors to Imperial Chemical Industries Limited, a corporation of Great Britain No Drawing. Application July 22, 1947, Serial No. 762,797. In Great Britain March 26, 1945

9 Claims. (Cl. 260—314.5)

This invention relates to the manufacture of new phthalocyanine derivatives, and more particularly it relates to phthalocyanines having aminoaryl groups attached to their aromatic nuclei, this application being a continuation-in-part of our copending application Serial No. 656,532, filed March 22, 1946, (Patent No. 2,430,052, issued November 4, 1947).

It is known that tetra-aminophthalocyanines are readily diazotised and that colouring matters may be prepared by coupling the phthalocyanine diazonium salts so obtained, with azo coupling components. These phthalocyanine diazonium salts, in common with diazonium salts generally, are liable to decompose, particularly at raised temperatures and even at room temperature or 0° C. Consequently, in coupling them decomposition tends to occur, the degree of decomposition depending especially on the temperature. The decomposition products thus arising are apt to contaminate the resulting azo colouring matter, and so may impair its technically useful properties.

We have now found that if the amino groups, instead of being attached directly to the phthalocyanine molecule, are attached to pendent aryl nuclei which are connected to the phthalocyanine nuclei either directly or through linking atoms or groups of atoms, then the stability of the corresponding diazonium salts is increased.

According to the present invention we provide a process for the manufacture of new phthalocyanine derivatives of the formula A[XArNH$_2$]$_n$ wherein A is a metal or metal-free phthalocyanine nucleus, Ar is a substituted or unsubstituted arylene nucleus, $n$ is a positive whole number not exceeding 4 and wherein X is a simple linkage or group of atoms as defined below. Said process in its essence comprises reducing compounds of the formula A[XArNO$_2$]$_n$, wherein A, Ar, $n$ and X have the significance given above.

The arylene nucleus in the above formula may be, for example, —C$_6$H$_4$—, —C$_6$H$_3$.CH$_3$— or —C$_{10}$H$_6$—.

As said, A is a metal or metal-free phthalocyanine nucleus. The metal may be any of those that are known for giving stable phthalocyanine compounds, for instance, copper, nickel, cobalt, iron, manganese, chromium or aluminum. When $n$ is less than 4, that is when one or more of the benzene nuclei of the phthalocyanine nucleus is free from —XArNO$_2$ radicals then A may if desired carry in these nuclei substituents other than —XArNO$_2$ radicals for example chlorine atoms, or phenyl or benzoyl groups.

The linkage X, for the purpose of the present application, may be a diatomic link as illustrated by the following: —SO$_2$—CH$_2$—; —SO$_2$—NR—; —NR—CO—; —NR—SO$_2$—; —SO$_2$—O—; —CH$_2$—S—; —CH$_2$—O—; wherein R stands for hydrogen or a hydrocarbon radical.

When $n$ in the above formulae is greater than 1, the X's and the Ar's may be respectively identical or different in the several XArNO$_2$ or XArNH$_2$ groups.

Suitable starting materials for the manufacture of the new compounds include for example: copper tetra-4-(p-nitro-benzoylamino)-phthalocyanine (obtainable by condensing copper tetra-4-aminophthalocyanine with p-nitrobenzoyl chloride); copper tetra-4-(m-nitrobenzene sulphonylamino)-phthalocyanine (obtainable by condensing copper tetra-4-aminophthalocyanine with m-nitrobenzenesulphonyl chloride); compounds of the formula A(SO$_2$.NHC$_6$H$_4$NO$_2$ (p))$_n$ where A is the copper phthalocyanine nucleus and $n$ is 2, 3 or 4 (obtainable by condensing copper phthalocyanine-di-4-, -tri-4- or -tetra-4-sulphonyl chloride with p-nitroaniline).

The reduction process of the invention may be carried out by conventional methods. Thus, there may be used as reducing agents for example those of the alkali sulphide class, including for example sodium sulphide, sodium hydrogen sulphide and the sodium polysulphides, alkali sulphites or bisulphites, alkali hydrosulphites, tin or zinc or stannous chloride and acid.

The new phthalocyanine derivatives consist of blue or green powders which may be diazotised and the so-obtained diazonium salts used as diazo components for the manufacture of new dyestuffs, by coupling them with the conventional coupling components. For this purpose it is convenient to use the new phthalocyanine derivatives in the form of aqueous pastes.

The invention is illustrated but not limited by the following examples in which the parts are by weight:

Example 1

The 10% aqueous paste of copper tetra-4-(p-nitrobenzoylamino)-phthalocyanine (made as described below) is agitated at 0–5° C. and to it are added 147 parts of concentrated hydrochloric acid of specific gravity 1.18. A solution of 160 parts of stannous chloride dihydrate in 200 parts of water is then added and the mixture is stirred during 16 hours, the temperature being allowed to rise slowly to 20° C. The product is filtered and the residual solid is washed well with dilute hydrochloric acid, until free from tin salts, then with water and then with dilute ammonium hydroxide solution. Finally, it is washed with water until free from ammonia. The so obtained copper tetra-4-(p-aminobenzoylamino)-phthalocyanine may be dried down to form a dark bluish green solid but is conveniently kept as an aqueous paste for use.

The aqueous paste of copper tetra-4-(p-nitrobenzoylamino)-phthalocyanine used in the above example is made as follows:

An aqueous paste containing 10.5 parts of copper tetra-4-aminophthalocyanine in filtered and the filter-cake is washed with acetone until free from water. The acetone-wet filter-cake is then added to 178 parts of dry nitrobenzene and the temperature of the mixture so obtained is raised until the acetone has distilled off. 45 parts of p-nitrobenzoyl chloride are then added to this suspension and the temperature is raised to 180° C, and so maintained during 8 hours. The resulting mixture is cooled to 100° C., diluted with 250 parts of hot ethanol and filtered. The filter-cake is digested with 200 parts of hot ethanol and filtered and this process is repeated until a colourless filtrate is obtained. The filter-cake is then washed well with water until all alcohol is removed and it is finally milled with water to give an approximately 10% paste.

Example 2

When in the process of the above example there is used in place of the 10% aqueous paste of copper tetra-4-(p-nitrobenzoylamino) phthalocyanine a 10% aqueous paste of copper tetra-4-(m-nitrobenzenesulphonylamino) phthalocyanine made from 10.5 parts of copper tetra-4-aminophthalocyanine by the action of 50 parts of m-nitrobenzenesulphonyl chloride there is obtained copper tetra-4-(m-aminobenzenesulphonylamino) phthalocyanine as an aqueous paste which may be dried, if desired, to give a dark bluish green solid.

Example 3

10 parts of copper phthalocyanine-tetra-4-sulphonchloride are added to 200 parts of dry nitrobenzene and the mixture is stirred at 90°–100° C. for 30 minutes. The mixture is then cooled to 60° C., and 10 parts of quinoline and 30 parts of p-nitroaniline are added. The mixture is then stirred at 170°–180° during 4 hours and cooled. 300 parts of benzene are added and the blue solid so precipitated is filtered off, washed with ethanol, and then with water. The solid is added to a solution of 30 parts of stannous chloride dihydrate in a mixture of 50 parts of water and 60 parts of concentrated hydrochloric acid, and the mixture is then ball-milled for 16 hours. The blue solid is then filtered off, washed successively with dilute hydrochloric acid until free from tin salts, water, dilute aqueous ammonia, and again with water until free from alkali. The copper phthalocyanine tetra-4-sulphon-(p-aminoanilide) so obtained is a blue solid which is conveniently kept as an aqueous suspension for the purpose of diazotisation.

Example 4

10 parts of copper phthalocyanine-tetra-4-sulphonchloride are added to 200 parts of dry nitrobenzene and the mixture is stirred at 90°–100° C. during 30 minutes. The mixture is cooled to 60° C., 10 parts of quinoline and 30 parts of p-nitrophenol are added and the resulting mixture is stirred at 180° C. for 4 hours. The mixture is then cooled, diluted with 300 parts of benzene, and filtered. The blue product obtained is washed on the filter with ethanol and then with water. The filter-cake is added to a solution of 30 parts of stannous chloride dihydrate in a mixture of 60 parts of concentrated hydrochloric acid and 50 parts of water, and the mixture is ball-milled for 16 hours. The blue product is filtered off and washed successively with dilute hydrochloric acid (until it is free from tin salts), water, dilute aqueous ammonia, and again with water until it is free from alkali. The copper phthalocyanine - tetra - 4 - sulphon - (p - aminophenyl) ester so obtained is a bright blue substance which is conveniently kept as an aqueous paste.

Example 5

Instead of the 10 parts of copper phthalocyanine-tetra-4-sulphonchloride used in Example 3 there are used 10 parts of metal-free phthalocyanine-trisulphonchloride. The final product so obtained is metal-free phthalocyanine-trisulphon-(p-aminoanilide) which is a blue substance, greener than the product of Example 3 and which is conveniently kept as an aqueous suspension.

Example 6

Instead of the 10 parts of copper phthalocyanine-tetra-4-sulphonchloride used in Example 4, there are used 10 parts of metal-free phthalocyanine-trisulphonchloride. The product so obtained is metal-free phthalocyanine trisulphon-(p-aminophenyl) ester, which is a blue substance, greener than the product of Example 4 and which may be conveniently kept as an aqueous paste.

Example 7

20 parts of chloromethylated copper phthalocyanine (containing 4 chloromethyl groups per molecule, and prepared according to copending application of Haddock and Wood, Serial No. 653,956, which matured into Patent No. 2,435,307) are ball-milled with 200 parts of β-ethoxyethanol for 24 hours. The suspension is added to a mixture obtained by dissolving 8.1 parts of sodium in 300 parts of β-ethoxyethanol and adding 60.4 parts of p-nitrothiophenol.

The mixture so obtained is stirred at 90°–100° C. during 2 hours and then at 130° C. during 4 hours. The mixture is then cooled, diluted with water and filtered. The residue is washed well with dilute aqueous sodium hydroxide until it is free from p-nitrothiophenol, and then with water until it is free from alkali and mineral salts.

The compact filter-cake is added to 250 parts of a 30% aqueous solution of sodium hydrogen sulphite, the mixture is ball-milled for 16 hours and then stirred at 95°–100° C. during 4 hours. The mixture is then cooled, filtered and the residue washed well with water until it is free from alkali and sulphide ions.

The product may be dried to form a blue powder but is preferably kept as an aqueous paste for the purpose of diazotisation.

Example 8

In place of the 8.1 parts of sodium and 60.4 parts of p-nitrothiophenol used in Example 7, there are used 60 parts of potassium p-nitrophenate and 10 parts of p-nitrophenol. The final product, so obtained, may be dried to form a bright blue solid, but is more conveniently kept as an aqueous paste for the purpose of diazotisation.

We are aware of British Patent No. 569,200, which is based on the invention of three of the present four inventors and claims phthalocyanine compounds of a related structure. Our present invention differs therefrom in that we employ here compounds having a diatomic link, that is the nitrophenyl radical in our initial material is separated from its corresponding phenylene radical of the fundamental phthalocyanine complex by two atoms such as —N—C—; —S—N—; —S—O—; etc. In British Patent No. 569,200 a monatomic link is employed, that is the separation is effected by a single oxygen, sulfur or carbon atom. Also, the group of compounds in the instant case is characterized by a related synthesis of the initial material. Thus, as illustrated by the examples above, the initial nitrophenyl derivative of the phthalocyanine is prepared by starting with a phthalocyanine compound having in some or all of its phenylene nuclei a substituent furnishing one half of said diatomic link, for instance an SO₂Cl, COCl or NH₂ radical; this compound is then condensed with a nitrophenyl compound bearing a substituent which provides the other half of the diatomic link. In British Patent 569,200, the initial material is synthesized by the so-called urea process from a phthalic anhydride, phthalic acid or phthalimide which already possesses the desired nitrophenyl radical as a side chain, attached through one of the aforementioned monoatomic links. A further important distinction is that our present process is, by virtue of its mode of selection of the initial material, of wider scope and is applicable for instance to metal-free phthalocyanine or other, special, metal-phthalocyanines which are not normally synthesizable by the urea process. As is well known, the phthalocyanine family of compounds constitutes a well known, closely related group of compounds having a characteristic molecular structure. (Linstead et al., Jour. of the Chem. Soc., 1934, page 1035.) This structure embraces a central metallic atom (or two hydrogen atoms), 8 N-atoms arranged in a system of rings around the central atom and 32 fundamental carbon atoms of which 8 are linked up with said N-atoms and 24 are present in the form of four phenylene nuclei. The outer positions of these phenylene nuclei may carry various substituents.

In the claims below, the expressions "the fundamental phthalocyanine complex" and "the fundamental complex of a phthalocyanine compound" shall be understood as referring to said principal phthalocyanine configuration, which comprises the central metallic atom (or its equivalent of H atoms), the principal 8 N-atoms, and the principal 32 carbon atoms; and "the phenylene nuclei of the fundamental phthalocyanine complex" shall be understood as referring to the aforementioned 4 phenylene nuclei. Any aromatic rings beyond the specified four can exist in a phthalocyanine molecule only by virtue of being attached, directly or through a bridging group of atoms, to one of the carbon atoms in one of said fundamental phenylene nuclei. To distinguish such additional rings from the fundamental ones, we shall hereinbelow designate such additional rings as pendent aryl nuclei.

We claim as our invention:

1. A phthalocyanine compound selected from the group consisting of metal phthalocyanines and metal-free phthalocyanines, and characterized by bearing in at least one of the phenylene nuclei of the fundamental phthalocyanine complex a pendent aryl radical selected from the group consisting of nitroaryl and amino aryl, said pendent aryl radical being attached to said phenylene radical through a diatomic bridging link.

2. A phthalocyanine compound of the general formula $$Q[X-Ar-Y]_n$$

wherein Q stands for the fundamental complex of a phthalocyanine compound selected from the group consisting of metal phthalocyanines and metal-free phthalocyanines, Ar designates an arylene radical comprising not over 10 carbon atoms in its cyclic structure, Y stands for a substituent selected from the group consisting of nitro and amino, X is a diatomic bridging link, while $n$ is a positive integer not exceeding 4.

3. A copper phthalocyanine compound characterized by bearing in at least one of its fundamental phenylene nuclei a pendent amino phenyl radical, which is attached to said phenylene radical through a diatomic bridging link.

4. A compound as defined in claim 3, the bridging link being of the form —NH—Z— wherein the nitrogen atom is attached to the fundamental phenylene nuclei and Z is attached to the pendent aminophenyl radical, Z being a radical of the group consisting of

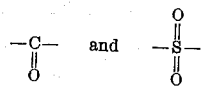

5. A compound as defined in claim 3, the bridging link being of the form —SO₂—Y— wherein the sulfur atom is attached to the fundamental phenylene nuclei and Y is attached to the pendent aminophenyl radical, Y being a radical of the group consisting of

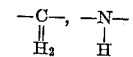

and —O—.

6. A compound as defined in claim 3, the bridging link being of the form —CH₂—E— wherein the carbon atom is attached to the fundamental phenylene nuclei and E is attached to the pendent aminophenyl radical, E being a radical of the group consisting of —S— and —O—.

7. A process of producing a diazotisable phthalocyanine compound, which comprises subjecting to reduction, whereby to convert the nitro groups into amino groups, a phthalocyanine compound selected from the group consisting of metal phthalocyanines and metal-free phthalocyanines and characterized by bearing in at least one of its fundamental phenylene nuclei a pendent nitroaryl radical which is attached to said phenylene nucleus through a diatomic bridge link.

8. A process for producing a phthalocyanine compound of the general formula $$Q[X-Ar-Y]_n$$

wherein Q stands for the fundamental complex of a phthalocyanine compound selected from the group consisting of metal phthalocyanines and metal-free phthalocyanines, Ar designates an arylene radical comprising not over 10 carbon atoms in its cyclic structure, Y stands for an amino group, X is a diatomic bridging link, and $n$ is a positive integer not exceeding 4, which comprises subjecting to reduction the corresponding phthalocyanine compound wherein Y designates a nitro group under conditions which will generally reduce a nitro group to the amino stage.

9. A process for producing a phthalocyanine compound of the general formula $$Q[X-Ar-Y]_n$$

wherein Q stands for the fundamental complex of a phthalocyanine compound selected from the group consisting of metal phthalocyanines and metal-free phthalocyanines, Ar designates an arylene radical comprising not over 10 carbon atoms in its cyclic structure, Y stands for a nitro group, X is a diatomic bridging link, and $n$ is a positive integer not exceeding 4, which comprises reacting 1 molecular proportion of a compound of the formula $Q-A_n$ with $n$ molecular proportions of a compound Y—Ar—B where Q, Y and $n$ have the significance given above and A and B are radicles selected from the class comprising —NH₂, —OH, —SH, —COCl, —SO₂Cl and —CH₂Cl provided that one of the radicles A and B contains a reactive hydrogen atom and the other radicle contains a reactive chlorine atom.

NORMAN HULTON HADDOCK.
WILLIAM OWEN JONES.
ALEXANDER PARKINSON.
GEORGE ALSTON ROWE.

REFERENCES CITED

The following references are of record in the file of this patent:

UNITED STATES PATENTS

| Number | Name | Date |
|---|---|---|
| 2,414,374 | Haddock et al. | Jan. 14, 1947 |

FOREIGN PATENTS

| Number | Country | Date |
|---|---|---|
| 569,200 | Great Britain | May 11, 1945 |